(12) United States Patent
Nakata et al.

(10) Patent No.: US 7,981,206 B2
(45) Date of Patent: Jul. 19, 2011

(54) INKJET INK, METHOD FOR PRODUCING THE SAME, INK CARTRIDGE, AND INKJET RECORDING METHOD

(75) Inventors: Eiichi Nakata, Saitama (JP); Daiji Okamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 276 days.

(21) Appl. No.: 12/432,594

(22) Filed: Apr. 29, 2009

(65) Prior Publication Data

US 2009/0272291 A1 Nov. 5, 2009

(30) Foreign Application Priority Data

Apr. 30, 2008 (JP) ................................. 2008-118806

(51) Int. Cl.
C09D 11/02 (2006.01)
B41J 2/01 (2006.01)
(52) U.S. Cl. ..................................... 106/31.48; 347/100
(58) Field of Classification Search ............... 106/31.48; 347/100
See application file for complete search history.

(56) References Cited

U.S. PATENT DOCUMENTS

| 7,387,668 | B2 * | 6/2008 | Kitayama et al. | 106/31.48 |
| 7,553,358 | B2 * | 6/2009 | Okamura et al. | 106/31.48 |
| 7,740,696 | B2 * | 6/2010 | Takahashi et al. | 106/31.48 |
| 7,771,525 | B2 * | 8/2010 | Morita et al. | 106/31.48 |
| 2005/0115458 | A1 * | 6/2005 | Oki et al. | 106/31.48 |
| 2006/0005744 | A1 * | 1/2006 | Kitayama et al. | 106/31.48 |

(Continued)

FOREIGN PATENT DOCUMENTS

JP 2-233781 9/1990

(Continued)

*Primary Examiner* — Helene Klemanski
(74) *Attorney, Agent, or Firm* — Canon U.S.A., Inc., IP Division

(57) ABSTRACT

An inkjet ink contains at least one coloring material selected from the group of C. I. Acid Yellow 23, C. I. Direct Yellow 86, C. I. Direct Yellow 132, and C. I. Direct Yellow 173, and a coloring material including a compound expressed by general formula (I):

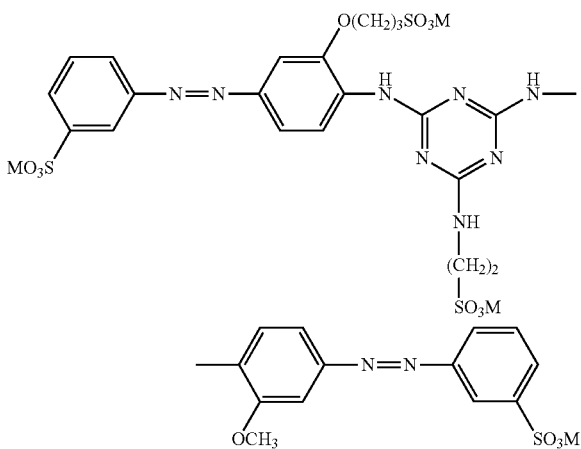

wherein in the formula (I), each M independently represents hydrogen, an alkali metal, ammonium, or an organic ammonium.

9 Claims, 2 Drawing Sheets

| U.S. PATENT DOCUMENTS | | | | |
|---|---|---|---|---|
| 2007/0119341 A1* | 5/2007 | Kitayama et al. | | 106/31.48 |
| 2008/0274285 A1* | 11/2008 | Okamura et al. | | 106/31.48 |
| 2009/0117341 A1* | 5/2009 | Takahashi et al. | | 106/31.48 |
| 2009/0130399 A1* | 5/2009 | Takahashi et al. | | 106/31.48 |
| 2010/0068475 A1* | 3/2010 | Morita et al. | | 106/31.48 |
| 2010/0233450 A1* | 9/2010 | Morita et al. | | 347/100 |

| FOREIGN PATENT DOCUMENTS | | |
|---|---|---|
| JP | 4-233975 | 8/1992 |
| JP | 11-070729 | 3/1999 |
| JP | 2001-288391 | 10/2001 |
| JP | 2004-285269 | 10/2004 |
| WO | WO 2008/053776 A1 * | 5/2008 |

* cited by examiner

INKJET INK, METHOD FOR PRODUCING THE SAME, INK CARTRIDGE, AND INKJET RECORDING METHOD

BACKGROUND OF THE INVENTION

1. Field of the Invention

The present invention relates to an inkjet ink, a method for producing the inkjet ink, an ink cartridge, and an inkjet recording method.

2. Description of the Related Art

An inkjet recording method is a recording method for forming an image by applying ink droplets onto a recording medium, such as plain paper or a glossy medium. As the price is reduced and the recording speed is increased, this method is rapidly spreading. In addition, as digital cameras are spreading rapidly, and the quality of images formed by the inkjet recording method becomes enhanced, it is increasingly demanded that the inkjet recording method produce recorded matter that is substantially equal in quality to silver halide photographs.

In order that the recorded matter produced by the inkjet recording method is substantially equal in quality to silver halide photographs, images formed by the inkjet method may be required to have properties including relatively high color developability and fastness. When recorded matter produced with a yellow ink is stored in a high-humidity atmosphere for a long time, the coloring material of the recorded matter may easily migrate, which may change the color tone of the image or fade the image; hence such recorded matter may be inferior in moisture-fastness. In particular, images formed with yellow inks tend to be inferior in moisture-fastness to those formed with cyan inks or magenta inks. Accordingly, studies have been conducted on the moisture-fastness of images formed with yellow inks.

In order to enhance the moisture-fastness of images, Japanese Patent Laid-Open Nos. 02-233781 and 04-233975 propose inks containing coloring materials having a specific structure, including C. I. Direct Yellow 86 or C. I. Direct Yellow 173. Japanese Patent Laid-Open No. 2004-285269 proposes that use of a novel additive enhances the moisture-fastness of images.

In addition, recorded matter produced by the inkjet recording method tends to have lower gas-fastness and light-fastness than silver halide photographs. More specifically, the coloring material of recorded matter may be degraded by being exposed to light, humidity, heat, ozone gas or the like in the air for a long time. Consequently, the image is liable to deteriorate in color tone or fade.

Proposals have been made to enhance the gas-fastness and light-fastness of images formed with yellow inks. Japanese Patent Laid-Open Nos. 11-70729 and 2001-288391 propose yellow dye inks that can produce images having high color developability, ozone-fastness, and light-fastness. These yellow dye inks contain C. I. Direct Yellow 132 as a yellow dye.

As described above, various studies have been made to enhance the fastness properties of images formed with yellow inks. However, no approach has yet achieved a yellow ink that adequately satisfies recent requirements for high-level color developability, moisture-fastness, gas-fastness, and light-fastness.

SUMMARY OF THE INVENTION

According to an aspect of the invention, an inkjet ink is provided that contains at least one coloring material selected from the group of C. I. Acid Yellow 23, C. I. Direct Yellow 86, C. I. Direct Yellow 132 and C. I. Direct Yellow 173, and a coloring material including a compound expressed by general formula (I):

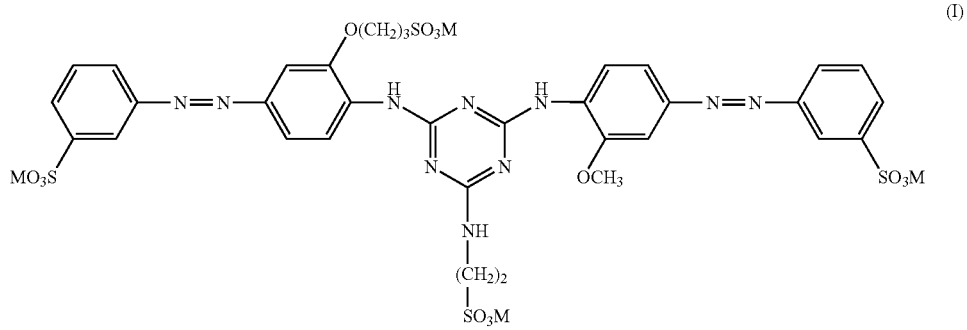

wherein in formula (I), each M independently represents hydrogen, an alkali metal, ammonium, or an organic ammonium.

According to another aspect of the invention, a method for producing an inkjet ink is provided which includes filling an ink containing at least one coloring material selected from the group of C. I. Acid Yellow 23, C. I. Direct Yellow 86, C. I. Direct Yellow 132 and C. I. Direct Yellow 173, into an ink holder of an ink cartridge accommodating an inkjet ink containing a coloring material including a compound expressed by general formula (I):

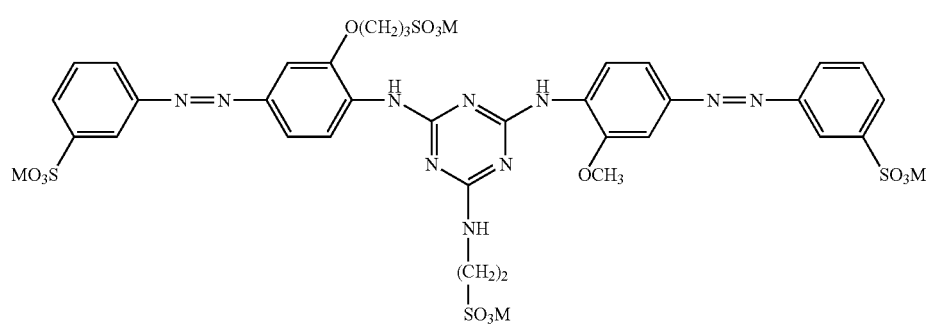

(I)

wherein in the formula (I), each M independently represents hydrogen, an alkali metal, ammonium, or an organic ammonium.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain principles of the present invention.

DESCRIPTION OF THE EMBODIMENTS

Figure 1:
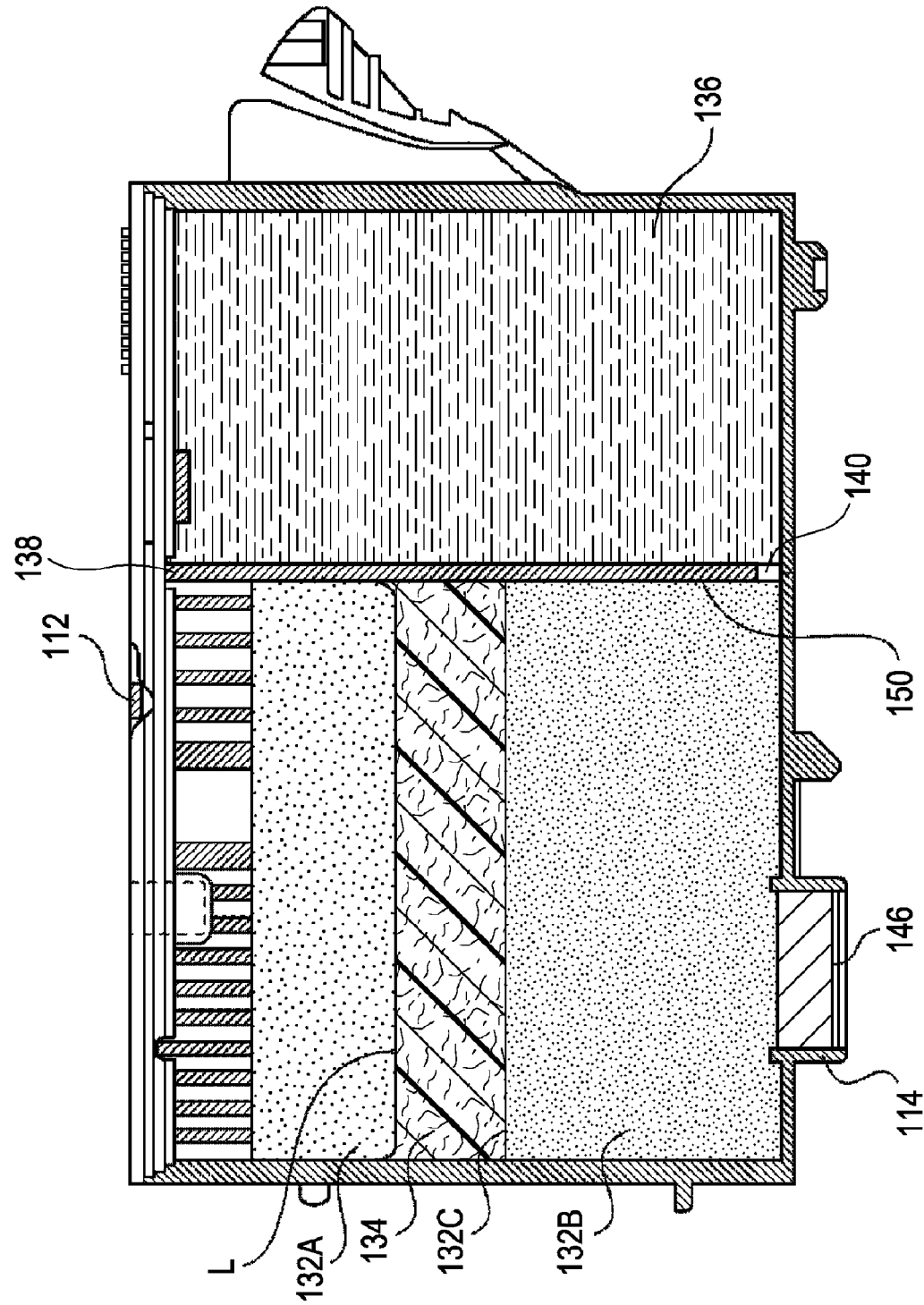
FIG. 1 is a schematic representation of an embodiment of an ink cartridge.

The present invention will further be described in detail with reference to exemplary embodiments. When a coloring material of an ink is a salt, the salt is dissociated into its constituent ions. In the following description, however, such an ink is expressed as an ink containing the salt for convenience in writing.

The present inventors have reviewed the known approaches to forming inkjet inks and reached the following findings. The inks disclosed in Japanese Patent Laid-Open Nos. 02-233781 and 04-233975 do not produce images having gas-fastness, light-fastness or color developability that satisfy the recent high-level requirements, while the use of a coloring material, such as C. I. Direct Yellow 86 or 173, can enhance the moisture-fastness of recorded images. However, the inventors have also discovered that if the additive disclosed in Japanese Patent Laid-Open No. 2004-285269 is used to produce a recorded image having a sufficient moisture-fastness, the additive content must be increased to some extent. When the present inventors recorded a patterned image by an inkjet recording apparatus using an ink containing a sufficient amount of additive to produce sufficient moisture-fastness, however, the resulting patterned image exhibited misalignment. Thus, it was found that such an ink cannot produce high quality images. Furthermore, the recorded images produced with inks containing C. I. Direct Yellow 132 disclosed in Japanese Patent Laid-Open Nos. 11-70729 and 2001-288391 can be superior in color developability, light-fastness, and gas-fastness, but the moisture-fastness is insufficient.

Accordingly, the present inventors have devised an improved inkjet ink. Embodiments of the inkjet ink may be capable of forming images with good and even superior color developability, moisture-fastness, gas-fastness, light-fastness, and quality, such as those described in the Examples disclosed herein. A method for producing the inkjet ink, as well as an ink cartridge and an inkjet recording method using the inkjet ink, are also provided.

<Inkjet Ink>

Constituents of an inkjet ink (hereinafter simply referred to as ink in some cases) according to an embodiment of the invention will now be described.

(Coloring Material)

The ink according to an embodiment of the invention contains at least one coloring material selected from the group consisting of C. I. Acid Yellow 23, C. I. Direct Yellow 86, C. I. Direct Yellow 132 and C. I. Direct Yellow 173. Each of these coloring materials can impart properties of superior color developability and fastness to images formed therewith. Accordingly, images recorded by an inkjet method using an ink containing such a coloring material can even have color developability and fastness properties substantially equal to those of silver halide photographs. In the following description, the group consisting of C. I. Acid Yellow 23, C. I. Direct Yellow 86, C. I. Direct Yellow 132 and C. I. Direct Yellow 173, may be referred to as the coloring material group in some cases.

The ink according to aspects of the invention contains a compound expressed by the following general formula (I) as another coloring material in addition to the coloring material selected from the coloring material group. The compound expressed by general formula (I) may be capable of imparting highly superior moisture-fastness, light-fastness and gas-fastness to images, and may also be capable of remarkably enhancing the moisture-fastness, light-fastness, and gas-fastness of images formed with an ink containing the at least one coloring material selected from the coloring material group described above, even if the content thereof is low.

In other words, the ink according to aspects of the invention contains both a coloring material selected from the group of the above coloring materials, which may be capable of imparting properties of superior color developability and fastness to images, and a compound expressed by general formula (I). The use of the ink containing such coloring materials may be capable of enhancing the moisture-fastness, light-fastness and gas-fastness of images substantially without degrading the intrinsic color developability of the coloring materials of the coloring material group. The compound expressed by general formula (I) is as follows:

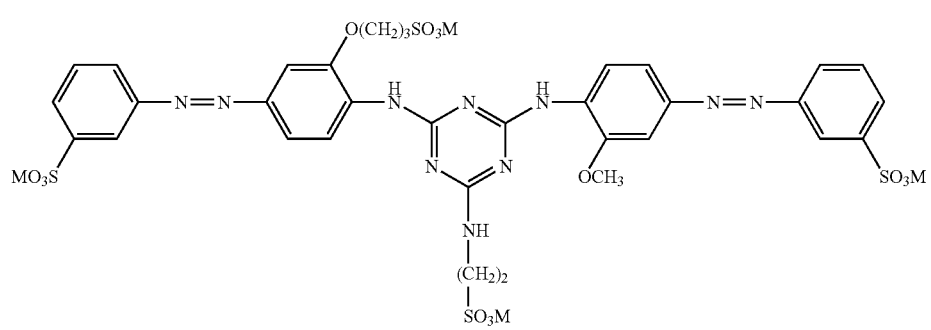

(I)

wherein each M independently represents hydrogen, an alkali metal, ammonium, or an organic ammonium.

In general formula (I), each M independently represents hydrogen, an alkali metal, ammonium, or an organic ammonium. Examples of the alkali metal can include, but are not limited to, lithium, sodium, and potassium. Examples of the organic ammonium can include, but are not limited to, acetamide, benzamide, methylamino, butylamino, diethylamino, and phenylamino.

The inkjet ink according to the aspects of the invention may further contain a compound expressed by general formula (II). An ink containing such a compound may be capable of dramatically enhancing the moisture-fastness, the light-fastness, and the gas-fastness of images. The compound expressed by general formula (II) is as follows:

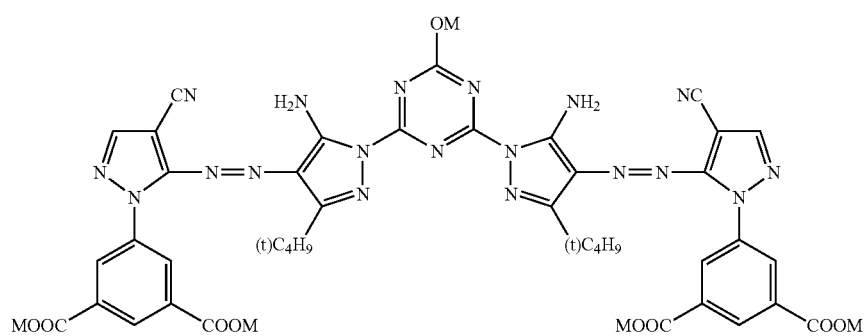

(II)

wherein each M independently represents hydrogen, an alkali metal, ammonium, or an organic ammonium.

In general formula (II), each M independently represents hydrogen, an alkali metal, ammonium, or an organic ammonium. Examples of the alkali metal can include, but are not limited to, lithium, sodium, and potassium. Examples of the organic ammonium can include, but are not limited to, acetamide, benzamide, methylamino, butylamino, diethylamino, and phenylamino.

[Coloring Material Contents]

The content of the compound expressed by general formula (I) in the ink can be 0.2% by mass or more relative to the total mass of the ink. If the content of the compound expressed by general formula (I) is less than 0.2% by mass, it can occur that the resulting image may not exhibit sufficient water-fastness, gas-fastness, or light-fastness. The content of the compound expressed by general formula (I) in the ink can also be 2.0% by mass or less relative to the total mass of the ink. If the content of the compound expressed by general formula (I) is more than 2.0% by mass, it can occur that the resulting image may not exhibit sufficient color developability.

In one version, the content of the coloring material selected from the coloring material group can be in the range of 0.55% to 9.25% by mass relative to the total mass of the ink.

When included in the ink composition, the content of the compound expressed by general formula (II) in the ink can be 0.2% by mass or more relative to the total mass of the ink. In certain embodiments, if the content of the compound expressed by general formula (II) is less than 0.2% by mass, it can occur that the resulting image may not exhibit sufficient water-fastness, gas-fastness, and light-fastness. The content of the compound expressed by general formula (II) in the ink can also be 2.0% by mass or less relative to the total mass of the ink. If the content of the compound expressed by general formula (II) is more than 2.0% by mass, it can occur that the resulting image may not exhibit sufficient color developability.

The total content of coloring materials can be in the range of 1.0% by mass or more to 10.0% by mass or less relative to the total mass of the ink. If the total content of coloring materials is less than 1.0% by mass, it can occur that the resulting image may not exhibit sufficient color developability or fastness properties; if the total coloring material content is more than 10.0% by mass, it can occur that the quality and storage stability of the resulting image may degrade.

In addition, the ratio of the content of the compound expressed by general formula (I) to the total content of coloring materials can be in the range of 7.5% by mass or more to 45.0% by mass or less. If the ratio of the content of the compound expressed by general formula (I) is less than 7.5% by mass to the total content of coloring materials, it can occur that the resulting image may not exhibit sufficient water-fastness, gas-fastness, or light-fastness, and a ratio of more than 45.0% may result in an image having insufficient color developability. The content of the compound expressed by general formula (I) and the total content of coloring materials are values relative to the total mass of the ink. In one version, the content of the compound expressed by general formula (I) is in the range of 0.2% by mass or more to 2.0% by mass or less, and its ratio to the total content of coloring materials is in the range of 7.5% by mass or more to 45.0% by mass or less.

[Confirmation of the Presence of Coloring Materials]

In one embodiment, by measuring the following three properties ((1) to (3)) by high performance liquid chromatography (HPLC), it can be determined whether or not an ink contains the coloring materials used in the ink according to aspects of the invention:

(1) Retention time;
(2) Maximum absorption wavelength in the peak of (1); and
(3) M/Z (posi, nega) of mass spectrum at the peak of (1).

HPLC can be performed under the following conditions. The ink liquid diluted to 1/1000 with pure water is used as a sample to be measured. The sample is subjected to HPLC analysis under the following conditions to measure the retention time of the peak and the maximum absorption wavelength in the peak.

Column: SunFire $C_{18}$, 2.1 mm×150 mm (manufactured by Waters Corporation)
Column temperature: 40° C.
Flow rate: 0.2 mL/min
PDA: 200 nm to 700 nm
Mobile phase and gradient conditions: see Table 1

TABLE 1

| Mobile phase and gradient conditions | | | | |
|---|---|---|---|---|
| | 0-5 min | 5-24 min | 24-31 min | 31-45 min |
| A: water | 85% | 85% → 45% | 45% → 0% | 0% |
| B: methanol | 10% | 10% → 50% | 50% → 95% | 95% |
| C: 0.2 mol/L ammonium acetate | 5% | 5% | 5% | 5% |

Mass spectroscopy can be performed under the following conditions. The mass spectrum of the resulting peak is measured under the following conditions and the most strongly detected M/Z is measured for each of posi and nega.

Ionization method
ESI
Capillary voltage: 3.5 kV
Desolvating gas: 300° C.
Ion source temperature: 120° C.
Detector
posi: 40 V 200 to 1500 amu/0.9 s
nega: 40 V 200 to 1500 amu/0.9 s Compounds (I) and (II), being respective representatives of the compounds expressed by general formulas (I) and (II), were subjected to the above-described measurements. Table 2 shows the resulting values of the retention time, maximum absorption wavelength, M/Z (posi) and M/Z (nega) for these compounds. Inks having unknown compositions may be subjected to the same measurements under the same conditions. When an ink shows values such as those shown in Table 2, it can be determined that the ink contains a compound that inks of the present invention should contain.

TABLE 2

| Analysis results | | | | |
|---|---|---|---|---|
| | Retention time (min) | Maximum absorption wavelength (nm) | M/Z posi | M/Z nega |
| Compound (1) | 30.0-31.0 | 390-410 | 922-925 | 920-923 |
| Compound (2) | 31.0-32.0 | 440-460 | 937-940 | 935-938 |

(Other Coloring Materials)

The inkjet ink of the present invention may further contain other coloring materials in addition to the at least one coloring material selected from the coloring material group described above, the compound expressed by general formula (I), and optionally the compound expressed by general formula (II).

For example, in order to form full color images, inks having different colors from the inks described above may be used in combination, such as for example at least one of cyan ink, magenta ink, yellow ink, gray ink, and black ink. Pale or light inks, which may have the same colors of these inks, may also be used in combination. Known coloring materials or newly synthesized coloring materials may also be used as coloring materials for the different color inks or the pale or light inks.

(Aqueous Medium)

In one embodiment, the ink according to aspects of the invention can contain water or an aqueous medium comprising a mixture of water and a water-soluble organic solvent. For example, deionized water (i.e., ion exchanged water) can be suitably used for the ink according to aspects of the invention. The water content in the ink can be in the range of 10.0% by mass or more to 90.0% by mass or less relative to the total mass of the ink. The content of a water-soluble organic solvent in the ink can be in the range of 5.0% by mass or more to 90.0% by mass or less, such as in the range of 10.0% by mass or more to 50.0% by mass or less. If the water-soluble organic solvent content is less than 5.0% by mass, it may be the case that the ink cannot be easily ejected. If the content is more than 10.0% by mass, it may be the case that the viscosity of the ink is increased and the ink may not be delivered properly.

The water-soluble organic solvent that may be used in the ink is not particularly limited, as long as the organic solvent is soluble in water. Examples of the water-soluble organic solvent can include, but are not limited to: alkyl alcohols having a carbon number of 1 to 4, such as ethanol, isopropanol, n-butanol, isobutanol, sec-butanol, and tert-butanol; carboxylic amides, such as N,N-dimethylformamide and N,N-dimethylacetamide; ketones and ketone alcohols, such as acetone, methyl ethyl ketone, and 2-methyl-2-hydroxypentane-4-one; cyclic ethers, such as tetrahydrofuran and dioxane; polyhydric alcohols, such as glycerin, 1,3-butanediol, 1,5-pentanediol, 1,2-hexanediol, 1,6-hexanediol, 2-methyl-1,3-propanediol, 1,2,6-hexanetriol, and trimethylolpropane; glycols, such as ethylene glycol, diethylene glycol, triethylene glycol, tetraethylene glycol, 1,2- or 1,3-propylene glycol, 1,2- or 1,4-butylene glycol, polyethylene glycol, and acetylene glycol derivatives; polyhydric alcohol alkyl ethers, such as ethylene glycol monomethyl (or monoethyl) ether, diethylene glycol monomethyl (or monoethyl) ether, and triethylene glycol monoethyl (or monobutyl) ether; heterocycles, such as 2-pyrrolidone, N-methyl-2-pyrrolidone, 1,3-dimethyl-2-imidazolidinone, and N-methylmorpholine; sulfur-containing compounds, such as thiodiglycol and dimethylsulfoxide; and nitrogen-containing compounds, such as urea and urea derivatives. These water-soluble organic solvents may be used singly or in combination.

(Other Additives)

The ink of the present invention may also optionally contain other additives, such as at least one of a surfactant, pH adjuster, chelating agent, corrosion inhibitor, preservative, antifungal agent, ultraviolet light adsorbent, viscosity modifier, antifoaming agent, and water-soluble polymer. For example, exemplary surfactants may include, but are not limited to, anionic surfactants, ampholytic surfactants, cationic surfactants, and nonionic surfactants.

<Inkjet Recording Method>

The ink according to embodiments of the present invention may be suitable for use in an inkjet recording method in which an ink is ejected by an inkjet method to perform recording on a recording medium. In inkjet recording methods, for example, at least one of mechanical energy and thermal energy may be applied to an ink to eject the ink. In one version, the inkjet recording method can use thermal energy.

<Ink Cartridge>

An ink cartridge in which the ink according to aspects of the present invention can be used includes an ink holder containing an ink. The ink holder can contain the ink according to aspects of the invention. Embodiments of such an ink cartridge will now be described.

FIG. 1 is a schematic representation of an embodiment of an ink cartridge. The ink cartridge has a negative pressure generation member-holding chamber 134 containing a negative pressure generation member 132, and a substantially closed ink holder 136 containing an ink. The negative pressure generation member-holding chamber 134 and the ink holder 136 are separated by a partition wall 138. The cartridge communicates with the atmosphere through an air communication port 112 at the upper portion thereof, and with an ink supply port 114 at the lower portion thereof. The negative pressure generation member-holding chamber 134 and the ink holder 136 communicate with each other only through a communication hole 140 formed in the partition wall 138 close to the bottom of the cartridge, and an air introducing groove 150 for promoting the introduction of air into the ink holder 136 during ink supply operation. A plurality of ribs protruding inward are integrally formed with the upper wall of the ink cartridge defining part of the negative pressure generation member-holding chamber 134, and are in contact with the negative pressure generation member contained under compression in the negative pressure generation member-holding chamber 134. The ribs form an air buffer between the upper wall and an upper surface of the negative pressure generation member. A pressure contact member 146 is disposed in an ink supply pipe having the ink supply port 114 so as to be in pressure contact with the negative pressure generation member 132. The pressure contact member 146 may have a higher capillary force and higher physical strength than the negative pressure generation member 132.

The negative pressure generation member-holding chamber 134 can contain two capillary force-generating type negative pressure generation members: first negative pressure generation member 132B; and a second negative pressure generation member 132A. These two negative pressure generation members may be made of an olefin resin fiber, such as polyethylene. The negative pressure generation members are separated by a boundary layer 132C. The intersection of the boundary layer 132C and the partition wall 138 is located at the upper side of the upper edge of the air introducing groove 150 in an operation position of the ink cartridge in which the ink supply port 114 faces down. The level L of the ink held in the negative pressure generation member 132 is higher than the level of the boundary layer 132C.

The boundary layer 132C may be pressed against the first negative pressure generation member 132B and the second negative pressure generation member 132A. Consequently, the portion of the negative pressure generation member 132 around the boundary layer 132C is compressed more than the other portion, and has a higher capillary force. When the first negative pressure generation member 132B has a capillary force P1, the second negative pressure generation member 132A has a capillary force P2, and the interface between these negative pressure generation members has a capillary force PS, such that the relationship P2<P1<PS holds.

Figure 2:
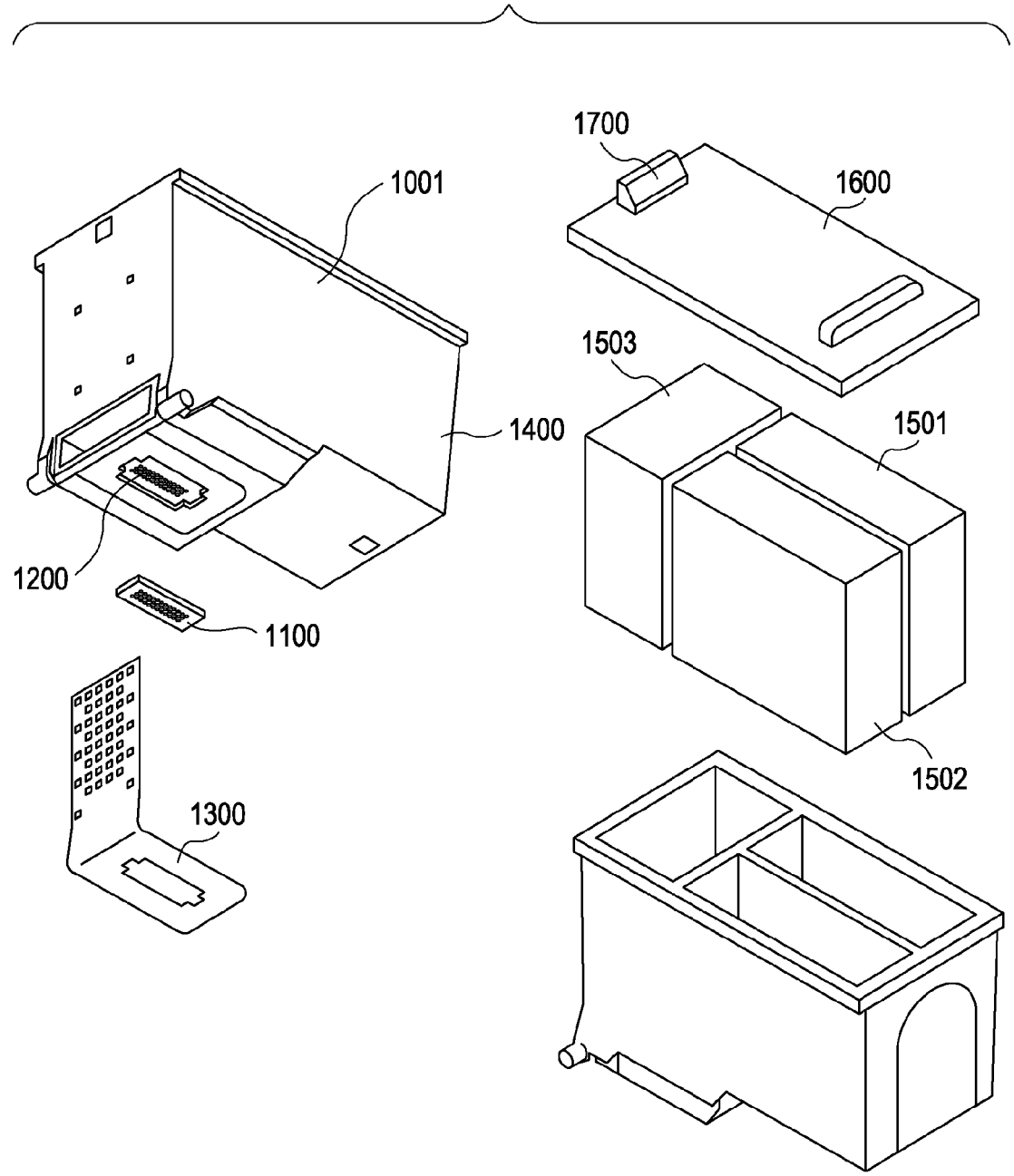
FIG. 2 is a schematic representation of another embodiment of an ink cartridge.

FIG. 2 is a schematic representation of another embodiment of an ink cartridge. This ink cartridge of this embodiment is integrated with a recording head. The ink cartridge 1001 is removably supported by, and secured to, a positioning member and an electrical contact of a carriage disposed in an inkjet recording apparatus. When the ink cartridge 1001 runs out of ink, it can be replaced.

The ink cartridge 1001 is configured to be capable of ejecting a plurality of inks of different colors (for example, cyan ink, magenta ink, and yellow ink). The ink cartridge includes a recording element substrate 1100, an electrical wiring tape 1300, an ink supplying/holding member 1400, ink absorption members 1501, 1502 and 1503, and a covering member 1600. Ink supply ports through which cyan, magenta, and yellow inks are respectively supplied are formed in parallel in the recording element substrate 1100. An electrical signal for ejecting ink is applied through the electrical wiring tape 1300. The ink supplying/holding member 1400 is made of a resin and contains the ink absorption members 1501, 1502, and 1503, producing negative pressure to hold ink.

The ink supporting/holding member 1400 may serve as an ink cartridge and to supply ink. More specifically, the ink supplying/holding member 1400 has spaces for the ink absorption members 1501 to 1503 that produce negative pressure to hold cyan, magenta, and yellow inks respectively, thus functioning as an ink cartridge. The ink supplying/holding member 1400 also has independent ink passages through which inks are delivered to the respective ink supply ports of the recording element substrate 1100, thus functioning to supply inks. The ink supply ports 1200 may be arranged downstream from the ink passages, and inks may be supplied therethrough to the recording element substrate 1100. The ink supply ports of the recording element substrate 1100 communicate with the respective ink supply ports 1200 of the ink supplying/holding member 1400, and thus the recording element substrate 1100 is secured to the ink supplying/holding member 1400. Part of the electrical wiring tape 1300 may be fixed to the plane surface around the ink supply port 1200. The covering member 1600 is welded to the upper edges of the ink supplying/holding member 1400 to cover the internal space in the ink supplying/holding member 1400. The covering member 1600 has an engaging portion 1700 securing the recording head to the inkjet recording apparatus.

<Method for Producing the Inkjet Ink>

The ink of the invention can be produced by any suitable method, as long as an ink is produced that satisfies requirements according to the aspects of invention, that is, as long as an ink is produced that contains at least one coloring material selected from the coloring material group described above, and another coloring material being a compound expressed by general formula (I).

In one version, a method according to an embodiment of the invention can include the step of filling an ink containing at least one coloring material selected from the above-described coloring material group into the ink holder of an ink cartridge, the ink holder accommodating (e.g., holding) an ink containing a compound expressed by general formula (I). Thus, the ink containing a compound expressed by general formula (I), which may be capable of imparting high fastness properties to images, and the ink cartridge containing the ink, may be recycled to reduce the cost and waste, and thus to reduce the environmental load of the ink cartridge and ink. In addition, an ink cartridge that has already contained ink once can provide the supplementary effect of allowing for relatively easy refilling of ink.

EXAMPLES

The invention will further be described in detail with reference to the following Examples and Comparative Examples. However, it should be understood that the invention is not limited to the Examples and other embodiments may also be provided, unless departing from the scope of the invention. In the Examples, the part or percent (%) used in the "Synthesis of coloring materials" and "Preparation of inks" are on a mass basis.

<Synthesis of Coloring Materials>

(Synthesis and Property Measurement of Compound (I))

Compound (I) was synthesized according to the following procedure. Compound (I) is a compound expressed by general formula (I), in which each M is sodium.

(1) Synthesis of Azo Compound Expressed by Formula (a)

In 200 parts of water was dissolved 17.3 parts of 3-aminobenzenesulfonic acid while the pH was adjusted to 6 with sodium hydroxide. Subsequently, 7.2 parts of sodium nitrite was added to the solution. The solution was adjusted to a temperature of 0 to 10° C. and dripped into 300 parts of 5% hydrochloric acid solution over a period of 30 minutes. Then, the mixture was stirred for an hour at a temperature of 10° C. or less, and thus a diazotization reaction was performed to produce a diazonium salt.

In 130 parts of water was dissolved 12.3 parts of 2-methoxy aniline while the pH was adjusted to 5 with sodium hydroxide. Then, a methyl-ω-sulfonic acid derivative was produced from the solution by a conventional process using 10.4 parts of sodium bisulfate and 8.6 parts of 35% formalin. The resulting methyl-ω-sulfonic acid derivative was added to the previously prepared diazonium salt. The mixture was stirred at a temperature of 0 to 15° C. and a pH of 2 to 4 for 5 hours. The resulting reaction mixture was adjusted to pH 11 with sodium hydroxide and then stirred at a temperature of 80 to 95° C. for 5 hours, while the pH was kept at 11. The resulting reaction mixture was subjected to salting-out by adding 100 parts of sodium chloride. The resulting precipitate was filtered to yield 100 parts of azo compound (sodium salt) expressed by formula (a) in a form of wet cake.

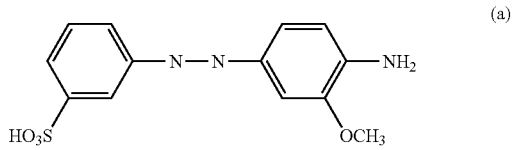

(a)

(2) Synthesis of Azo Compound Expressed by Formula (b)

In 200 parts of water was dissolved 17.3 parts of 3-aminobenzenesulfonic acid while the pH was adjusted to 6 with sodium hydroxide. Subsequently, 7.2 parts of sodium nitrite was added to the solution. The solution was adjusted to a temperature of 0 to 10° C. and dripped into 300 parts of 5% hydrochloric acid solution over a period of 30 minutes. Then, the mixture was stirred for an hour at a temperature of 10° C. or less, and thus a diazotization reaction was performed to produce a diazonium salt.

In 130 parts of water was dissolved 23.1 parts of 2-sulfopropoxy aniline while the pH was adjusted to 5 with sodium hydroxide. Then, a methyl-ω-sulfonic acid derivative was produced from the solution by a conventional process using 10.4 parts of sodium bisulfate and 8.6 parts of 35% formalin. The resulting methyl-ω-sulfonic acid derivative was added to the previously prepared diazonium salt. The mixture was stirred at a temperature of 0 to 15° C. and a pH of 2 to 4 for 5 hours. The resulting reaction mixture was adjusted to pH 11 with sodium hydroxide and then stirred at a temperature of 80 to 95° C. for 5 hours while the pH was kept at 11. The resulting reaction mixture was subjected to salting-out by adding 100 parts of sodium chloride. The resulting precipitate was filtered to yield 130 parts of azo compound (sodium salt) expressed by formula (b) in a form of wet cake.

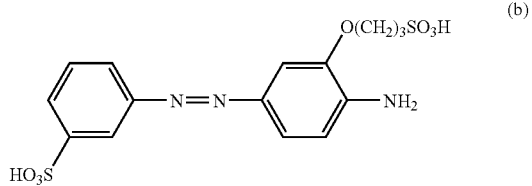

(b)

(3) Synthesis and Property Measurement of Compound (I)

Then, 0.10 part of surfactant (product name: LEOCOL TD90, produced by Lion Corporation) was added to 250 parts of ice water and vigorously stirred. To the mixture, 8.0 part of cyanuric chloride was added and stirred at a temperature of 0 to 5° C. for 30 minutes to yield a suspension. The suspension was dripped into a solution of 100 parts of the wet cake of azo compound expressed by formula (a) in 200 parts of water over a period of 30 minutes. Then, the mixture was stirred at a temperature of 0 to 10° C. and a pH of 5 to 6 for 6 hours to yield a solution. In addition, 130 parts of the wet cake of azo compound expressed by formula (b) obtained in an above synthesis was dissolved in 300 parts of water. The resulting solution was dripped into the previously prepared solution over a period of 30 minutes. Then, the mixture was stirred at a temperature of 25 to 35° C. and a pH of 6 to 7 for 6 hours. Furthermore, 18.8 parts of taurine was added, and the resulting mixture was stirred at a temperature of 75 to 80° C. and a pH of 7 to 9 for 3 hours to yield a reaction mixture. The reaction mixture was cooled to a temperature of 20 to 25° C., and 800 parts of acetone was added to the reaction mixture. The resulting mixture was stirred at a temperature of 20 to 25° C. for 1 hour to form a precipitate. The precipitate was filtered out to yield 95.0 parts of wet cake. The wet cake was dried with hot air of 80° C. to yield 30.0 parts of compound (I).

Compound (I)

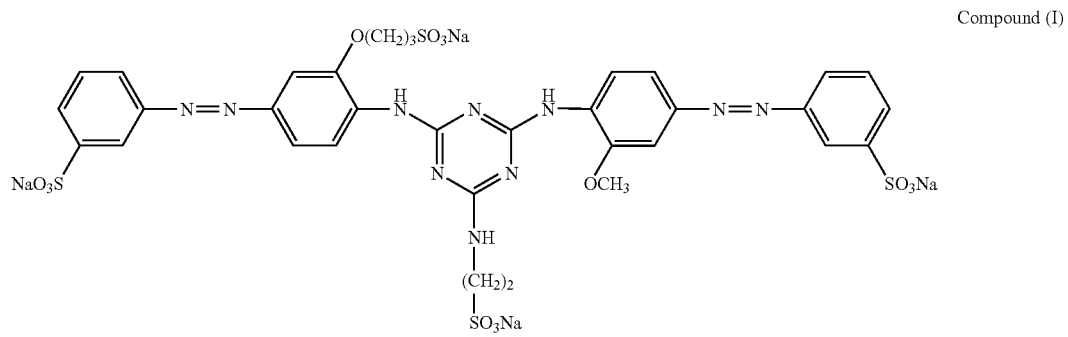

The obtained compound (I) was measured for $\lambda_{max}$ value in water under the following conditions, and the result was $\lambda_{max}$=391 nm.
Spectrophotometer: recording spectrophotometer (model U-3300, produced by Hitachi)
Measurement cell: 1 cm quartz cell
Sampling interval: 0.1 nm
Scanning speed: 30 nm/min (Compound (II))
Compound (II) is a compound expressed by general formula (II), in which each M is potassium. In the Examples, DYE-11 synthesized in Example 1 in International Publication No. WO 2005/014439 was used as compound (II).

Compound (II)

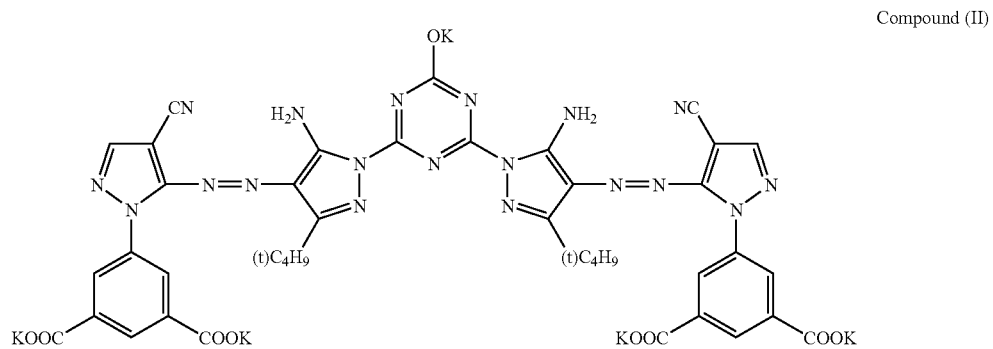

(Compound (III))
Compound (III) is a yellow dye expressed by the following formula and can impart relatively high moisture-fastness and color developability to images. The sodium salt of Dye No. 3 disclosed in Japanese Patent Laid-Open No. was used as Compound (III).

Compound (III)

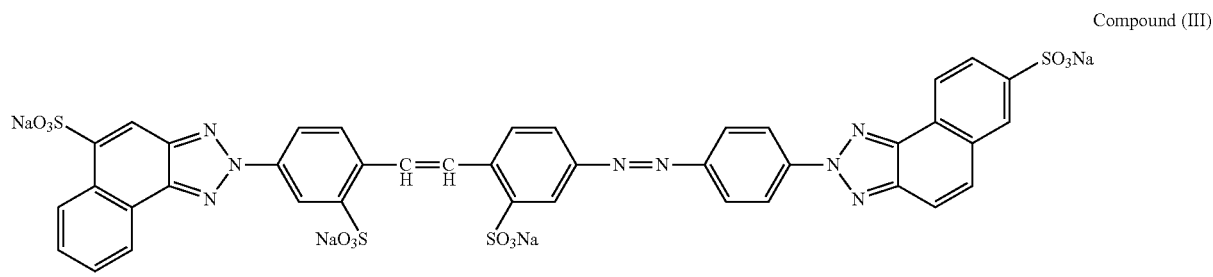

<Preparation of Inks>

Materials shown in Table 3 and 4 were sufficiently mixed, and the resulting mixture was pressure-filtered through a membrane filter having a pore size of 0.2 μm (manufactured by Advantech) to yield an ink. An additive, betaine compound (Compound (IV)), was added to the inks of Comparative Examples 9 to 12 for enhancing the moisture-fastness. Compound (IV) is a compound X1-1 disclosed in Japanese Patent Laid-Open No. 2004-285269.

Compound (IV)

<Preparation of Recorded Matter>

Ink cartridges filled with the respective inks prepared above were mounted separately in an inkjet recording apparatus (product name: Pixus iP8600, manufactured by Canon), and recorded matter was prepared. The recording was performed under the conditions: temperature 23° C., relative humidity 55%, recording density 2,400 dpi×1,200 dpi, and ejection amount 2.5 pL. An image (recording duty 60%) was formed on a recording medium (product name: Professional Photo Paper PR101, manufactured by Canon), and the resulting recorded matter was air-dried at a temperature of 23° C. and a relative humidity of 55% for 24 hours.

<Evaluation>

(Color Developability)

For the evaluation of color developability, the optical density of the yellow component in the image of the recorded matter was measured at a field of view of 2° with a spectro-

TABLE 3

Ink compositions of Examples (content, %)

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| C.I. Acid Yellow 23 | 3.7 | | | | 3.7 | | | | | | | |
| C.I. Direct Yellow 86 | | 3.7 | | | | 3.7 | | | | | | |
| C.I. Direct Yellow 132 | | | 3.7 | | | | 3.7 | | 2.2 | 2.0 | 1.9 | 3.9 |
| C.I. Direct Yellow 173 | | | | 3.7 | | | | 3.7 | | | | |
| Compound (I) | 0.3 | 0.3 | 0.3 | .0.3 | 0.2 | 0.2 | 0.2 | 0.2 | 1.8 | 2.0 | 2.1 | 0.1 |
| Compound (III) | | | | | | | | | | | | |
| Compound (IV) | | | | | | | | | | | | |
| Glycerin | 20.0 | 20.0 | 20.0 | 20.0 | 20.0 | 20.0 | 20.0 | 20.0 | 20.0 | 20.0 | 20.0 | 20.0 |
| Acetylenol E100 (*1) | 1.0 | 1.0 | 1.0 | 1.0 | 1.0 | 1.0 | 1.0 | 1.0 | 1.0 | 1.0 | 1.0 | 1.0 |
| Ion exchanged water | 75.0 | 75.0 | 75.0 | 75.0 | 75.1 | 75.1 | 75.1 | 75.1 | 75.0 | 75.0 | 75.0 | 75.0 |
| Total content of coloring materials | 4.0 | 4.0 | 4.0 | 4.0 | 3.9 | 3.9 | 3.9 | 3.9 | 4.0 | 4.0 | 4.0 | 4.0 |
| Compound (I) content | 0.3 | 0.3 | 0.3 | 0.3 | 0.2 | 0.2 | 0.2 | 0.2 | 1.8 | 2.0 | 2.1 | 0.1 |
| Ratio of Compound (I) (*2) | 7.5 | 7.5 | 7.5 | 7.5 | 5.1 | 5.1 | 5.1 | 5.1 | 45.0 | 50.0 | 52.5 | 2.5 |

(*1): Ethylene oxide adduct of acetylene glycol (surfactant, produced by Kawaken Fine Chemicals)

(*2): Ratio of compound expressed by general formula (I) to the total content of coloring materials = Compound (I)/all coloring materials × 100

TABLE 4

Ink compositions of Comparative Examples (content, %)

| | Comparative Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| C.I. Acid Yellow 23 | 3.7 | | | | 3.7 | | | | 3.7 | | | | |
| C.I. Direct Yellow 86 | | 3.7 | | | | 3.7 | | | | 3.7 | | | |
| C.I. Direct Yellow 132 | | | 3.7 | | | | 3.7 | | | | 3.7 | | |
| C.I. Direct Yellow 173 | | | | 3.7 | | | | 3.7 | | | | 3.7 | 4.0 |
| Compound (I) | | | | | | | | | | | | | |
| Compound (III) | | | | | 0.3 | 0.3 | 0.3 | 0.3 | | | | | |
| Compound (IV) | | | | | | | | | 0.3 | 0.3 | 0.3 | 0.3 | |
| Glycerin | 20.0 | 20.0 | 20.0 | 20.0 | 20.0 | 20.0 | 20.0 | 20.0 | 20.0 | 20.0 | 20.0 | 20.0 | 20.0 |
| Acetylenol E100 (*1) | 1.0 | 1.0 | 1.0 | 1.0 | 1.0 | 1.0 | 1.0 | 1.0 | 1.0 | 1.0 | 1.0 | 1.0 | 1.0 |
| Ion exchanged water | 75.3 | 75.3 | 75.3 | 75.3 | 75.0 | 75.0 | 75.0 | 75.0 | 75.0 | 75.0 | 75.0 | 75.0 | 75.0 |
| Total content of coloring materials | 3.7 | 3.7 | 3.7 | 3.7 | 4.0 | 4.0 | 4.0 | 4.0 | 3.7 | 3.7 | 3.7 | 3.7 | 4.0 |
| Compound (I) content | 0.0 | 0.0 | 0.0 | 0.0 | 0.0 | 0.0 | 0.0 | 0.0 | 0.0 | 0.0 | 0.0 | 0.0 | 0.0 |
| Ratio of Compound (I) (*2) | 0.0 | 0.0 | 0.0 | 0.0 | 0.0 | 0.0 | 0.0 | 0.0 | 0.0 | 0.0 | 0.0 | 0.0 | 0.0 |

(*1): Ethylene oxide adduct of acetylene glycol (surfactant, produced by Kawaken Fine Chemicals)

(*2): Ratio of compound expressed by general formula (I) to the total content of coloring materials = Compound (I)/all coloring materials × 100 photometer (Spectorolino, manufactured by Gretag Macbeth) using a D50 light source. The color developability was evaluated according to the following criteria. The results are shown in Table 5. In this evaluation, inks marked AA, A, and B exhibited sufficient property levels: AA represents a particularly high level; A represents a high level; and C represents an unacceptable level.

AA: Optical density≧1.7
A: 1.6≦Optical density<1.7.
B: 1.5≦Optical density<1.6.
C: Optical density<1.5

(Moisture-Fastness)

The recorded matter was allowed to stand in an atmosphere of a temperature of 30° C. and a humidity of 80% for 168 hours. Then, the recorded matter was visually observed. Specifically, the degree of color blurring to the unrecorded region was visually observed for the evaluation of moisture-fastness. The moisture-fastness was evaluated according to the following criteria. The results are shown in Table 5. In this evaluation, inks marked A and B exhibited sufficient property levels: A represents a high level; and C represents an impermissible level.

A: Color blurring to unrecorded region was hardly observed.
B: Color blur slightly to unrecorded region.
C: Color blur considerably to unrecorded region.

(Light-Fastness)

The optical density of the yellow component in the image of the recorded matter was measured at a field of view of 2° with a spectrophotometer (Spectorolino, manufactured by Gretag Macbeth) using a D50 light source. Then, the recorded matter was placed in Super Xenon Weather Meter (model: SX-75, manufactured by Suga Test Instrument), and exposed to light having an irradiation intensity of 100 klx under conditions of a temperature of 24° C. and a relative humidity of 60% for 168 hours. After the exposure, the optical density of the yellow component in the image of the recorded matter was measured under the same conditions as above. The residual optical density rate was calculated from the optical densities before and after the test (exposure) according to the following equation for the evaluation of light-fastness. The light-fastness was evaluated according to the following criteria. The results are shown in Table 5. In this evaluation, inks marked AA, A, and B exhibited sufficient property levels: AA represents a particularly high level; A represents a high level; and C represents an unacceptable level.

$$\text{residual optical density rate } [\%] = \frac{\text{Optical density after test}}{\text{Optical density before test}} \times 100[\%]$$

AA: residual optical density rate≧75%
A: 70%≦residual optical density rate<75%
B: 65%≦residual optical density rate<70%
C: residual optical density rate<65%

(Gas-Fastness)

The optical density of the yellow component in the image of the recorded matter was measured at a field of view of 2° with a spectrophotometer (Spectorolino, manufactured by Gretag Macbeth) using a D50 light source. Then, the recorded matter was placed in Ozone Weather Meter (model: OMS-H, manufactured by Suga Test Instrument), and exposed to ozone gas of 10 ppm in concentration under conditions of a temperature of 40° C. and a relative humidity of 60% for 4 hours. After the exposure, the optical density of the yellow component in the image of the recorded matter was measured under the same conditions as above. The residual optical density rate was calculated from the optical densities before and after the test (exposure) according to the above equation for the evaluation of gas-fastness. The gas-fastness was evaluated according to the following criteria. The results are shown in Table 5. In this evaluation, inks marked AA, A, and B exhibited sufficient property levels: AA represents a particularly high level; A represents a high level; and C represents an unacceptable level.

AA: residual optical density rate≧90%
A: 85%≦residual optical density rate<90%
B: 80%≦residual optical density rate<85%
C: residual optical density rate<80%

(Image Quality)

Ink cartridges filled with the respective inks prepared above were mounted separately in an inkjet recording apparatus (product name: Pixus iP8600, manufactured by Canon), and recorded matter was prepared. The recording was performed under the conditions: temperature 23° C., relative humidity 55%, recording density 2,400 dpi×1,200 dpi, and ejection amount 2.5 pL. A pattern of vertical ruled lines drawn at intervals of about 400 μm was recorded over the entire surfaces of 50 sheets of A4 recording media (product name: high resolution paper HR-101, manufactured by Canon). The state of misalignment in the pattern on the 50th sheet was visually observed for the evaluation of image quality. The image quality was evaluated according to the following criteria. The results are shown in Table 5. In this evaluation, A represents a sufficient property level, and B represents an unacceptable property level.

A: No misalignment was observed.
B: At least one misaligned line was observed.

TABLE 5

| | | Evaluation results | | | | |
|---|---|---|---|---|---|---|
| | | Color developability | Moisture-fastness | Light-fastness | Gas-fastness | Image quality |
| Example | 1 | AA | A | A | A | A |
| | 2 | AA | A | A | A | A |
| | 3 | AA | A | A | A | A |
| | 4 | AA | A | A | A | A |
| | 5 | AA | B | A | B | A |
| | 6 | AA | B | A | B | A |
| | 7 | AA | B | A | B | A |
| | 8 | A | B | A | A | A |
| | 9 | AA | A | A | A | A |
| | 10 | A | A | A | A | A |
| | 11 | B | A | A | A | A |
| | 12 | AA | B | B | B | A |
| Comparative Example | 1 | AA | C | C | C | A |
| | 2 | AA | B | C | C | A |
| | 3 | AA | C | C | C | A |
| | 4 | C | B | C | A | A |
| | 5 | AA | A | C | C | A |
| | 6 | AA | A | C | C | A |
| | 7 | AA | A | C | C | A |
| | 8 | AA | A | C | A | A |
| | 9 | AA | A | C | C | B |
| | 10 | AA | A | C | C | B |
| | 11 | AA | A | C | C | B |
| | 12 | C | A | C | A | B |
| | 13 | C | C | C | A | A |

<Preparation of Ink>

Materials shown in Table 6 were sufficiently mixed, and the resulting mixture was pressure-filtered through a membrane filter having a pore size of 0.2 μm (manufactured by Advantech) to yield ink A.

TABLE 6

| Ink composition (%) | |
|---|---|
| | Ink A |
| Compound (I) | 2.70 |
| Compound (II) | 1.30 |
| Glycerin | 20.00 |
| Acetylenol E100 (*1) | 1.00 |
| Ion exchanged water | 75.00 |

(*1): Surfactant, produced by Kawaken Fine Chemicals

Ten grams of Ink A prepared according to the composition shown in Table 6 was filled into four ink cartridges each having the structure shown in the embodiment of FIG. 1. Then, 8.0 g of Ink A was ejected from each ink cartridge. Eight grams of inks of Comparative Examples 1 to 4 were filled into the above respective ink cartridges. Thus, inks of Examples 13 to 16 were prepared. The inks of Examples 13 to 16 were extracted from the respective ink cartridges and were subjected to composition analysis. These inks had the compositions shown in Table 7.

TABLE 7

| Ink composition (content, %) | | | | |
|---|---|---|---|---|
| | Example | | | |
| | 13 | 14 | 15 | 16 |
| C.I. Acid Yellow 23 | 2.63 | | | |
| Direct Yellow 86 | | 2.63 | | |
| C.I. Direct Yellow 132 | | | 2.63 | |
| C.I. Direct Yellow 173 | | | | 2.63 |
| Compound (I) | 0.43 | 0.43 | 0.43 | 0.43 |
| Compound (II) | 0.63 | 0.63 | 0.63 | 0.63 |
| Glycerin | 20.00 | 20.00 | 20.00 | 20.00 |
| Acetylenol E100 (*1) | 1.00 | 1.00 | 1.00 | 1.00 |
| Ion exchanged water | 75.31 | 75.31 | 75.31 | 75.31 |
| Total content of coloring materials | 3.69 | 3.69 | 3.69 | 3.69 |
| Compound (I) content | 0.43 | 0.43 | 0.43 | 0.43 |
| Ratio of Compound (I) (*2) | 11.7 | 11.7 | 11.7 | 11.7 |

(*1): Ethylene oxide adduct of acetylene glycol (surfactant, produced by Kawaken Fine Chemicals)
(*2): Ratio of compound expressed by general formula (I) to the total content of coloring materials = Compound (I)/all coloring materials × 100

<Evaluation>

Ink cartridges filled with the respective inks of Examples 13 to 16 were mounted separately in an inkjet recording apparatus (product name: Pixus iP8600, manufactured by Canon), and recorded matter was prepared. The recording was performed under the conditions: temperature 23° C., relative humidity 55%, recording density 2,400 dpi×1,200 dpi, and ejection amount 2.5 pL. An image (recording duty 60%) was formed on a recording medium (product name: Professional Photo Paper PR101, manufactured by Canon), and the resulting recorded matter was air-dried at a temperature of 23° C. and a relative humidity of 55% for 24 hours. The color developability, moisture-fastness, light-fastness, gas-fastness, and image quality of thus prepared recorded matter were evaluated according to the same criteria as above. The results are shown in Table 8.

TABLE 8

| | | Evaluation results | | | | |
|---|---|---|---|---|---|---|
| | | Color developability | Moisture-fastness | Light-fastness | Gas-fastness | Image quality |
| Example | 13 | AA | A | AA | AA | A |
| | 14 | AA | A | AA | AA | A |
| | 15 | AA | A | AA | AA | A |
| | 16 | AA | A | AA | AA | A |

Accordingly, the examples in accordance with aspects of the present invention may be capable of providing an inkjet ink that can form images having good and even superior in color developability, moisture-fastness, gas-fastness, light-fastness, and quality. The examples in accordance with aspects of the present invention may be capable of providing a method for producing an inkjet ink that can form images that are good and even superior in color developability, moisture-fastness, gas-fastness, light-fastness, and quality. Furthermore, the examples in accordance with aspects of the present invention may be capable of providing an ink cartridge and an inkjet recording method using the inkjet ink.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-118806 filed Apr. 30, 2008, which is hereby incorporated by reference herein in its entirety.

What is claimed is:

1. An inkjet ink comprising:
   at least one coloring material selected from the group consisting of C. I. Acid Yellow 23, C. I. Direct Yellow 86, C. I. Direct Yellow 132 and C. I. Direct Yellow 173; and
   a coloring material comprising a compound expressed by general formula (I):

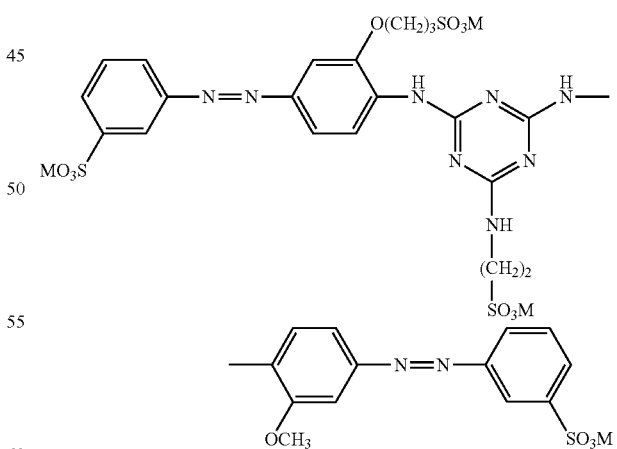

wherein each M independently represents hydrogen, an alkali metal, ammonium, or an organic ammonium.

2. The inkjet ink according to claim 1, wherein the content of the compound expressed by general formula (I) in the inkjet ink is 0.2% by mass or more relative to the total mass of the inkjet ink.

3. The inkjet ink according to claim 1, further comprising a compound expressed by general formula (II):

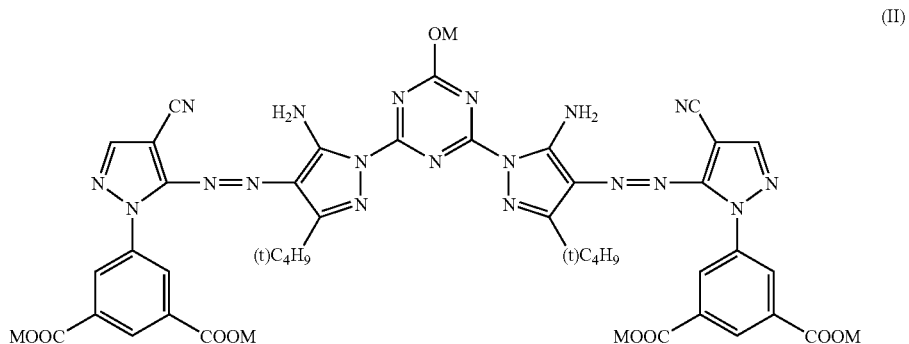

wherein each M independently represents hydrogen, an alkali metal, ammonium, or an organic ammonium.

4. A method for producing an inkjet ink, the method comprising:
filling an inkjet ink containing at least one coloring material selected from the group consisting of C. I. Acid Yellow 23, C. I. Direct Yellow 86, C. I. Direct Yellow 132 and C. I. Direct Yellow 173, into an ink holder of an ink cartridge, the ink holder accommodating an inkjet ink containing a coloring material comprising a compound expressed by general formula (I):

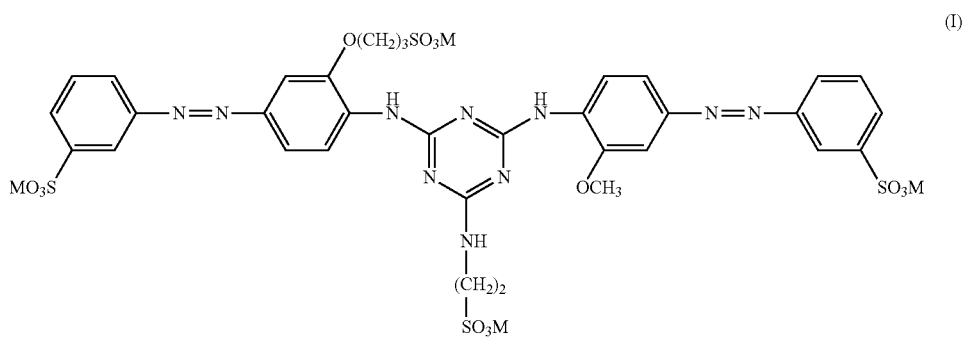

wherein each M independently represents hydrogen, an alkali metal, ammonium, or an organic ammonium.

5. An inkjet ink produced by the method as set forth in claim 4.

6. An ink cartridge comprising an ink holder containing the inkjet ink as set forth in claim 1.

7. An ink cartridge comprising an ink holder containing the inkjet ink as set forth in claim 5.

8. An inkjet recording method, the method comprising:
ejecting the inkjet ink as set forth in claim 1 to perform recording on a recording medium.

9. An inkjet recording method, the method comprising:
ejecting the inkjet ink as set forth in claim 5 to perform recording on a recording medium.

* * * * *